C. H. ABBOTT.
INCUBATOR.
APPLICATION FILED NOV. 26, 1917. RENEWED SEPT. 12, 1919.
1,337,183. Patented Apr. 20, 1920.
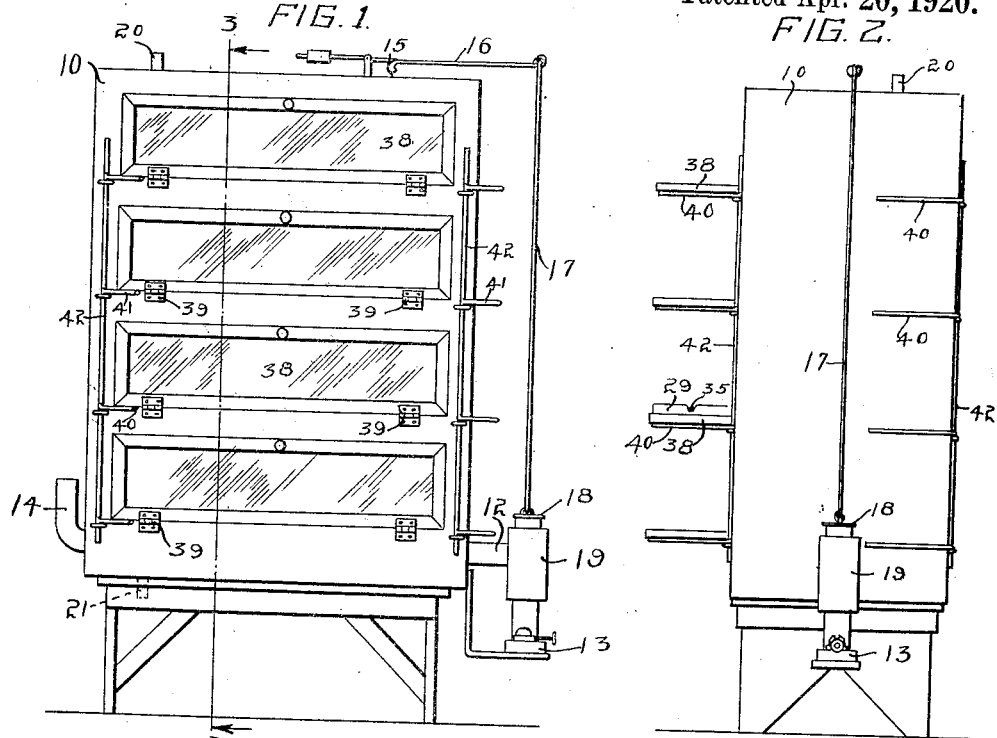
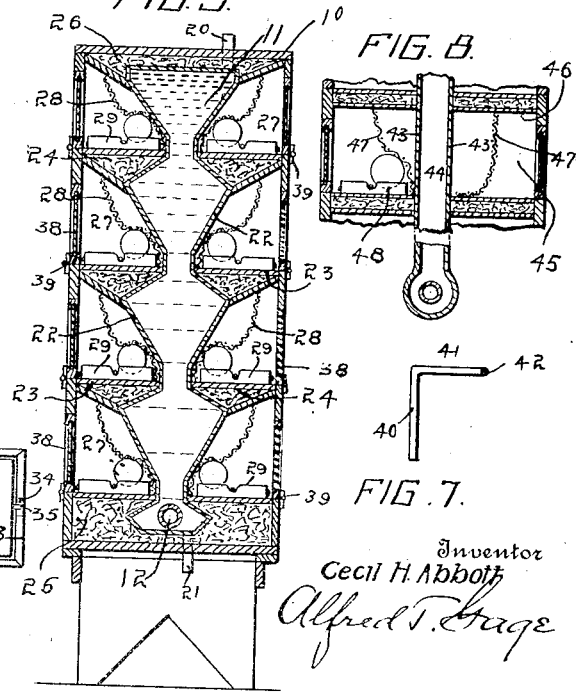
Inventor
Cecil H. Abbott
Attorney

UNITED STATES PATENT OFFICE.

CECIL H. ABBOTT, OF CHESTER, VIRGINIA, ASSIGNOR OF ONE-HALF TO JEFFERSON LODRICK FOUNTAIN, JR., OF RALEIGH, NORTH CAROLINA.

INCUBATOR.

1,337,183. Specification of Letters Patent. Patented Apr. 20, 1920.

Application filed November 26, 1917, Serial No. 203,991. Renewed September 12, 1919. Serial No. 323,433.

*To all whom it may concern:*

Be it known that I, CECIL H. ABBOTT, a subject of the King of Great Britain, residing at Chester, in the county of Chesterfield and State of Virginia, have invented certain new and useful Improvements in Incubators, of which the following is a specification.

This invention relates to an incubator and particularly to a construction wherein the upper surface of an egg is brought into contact with a heated surface, and comprises a continuation in part of my application filed November 1, 1915, Serial No. 59,054 for a similar invention.

The invention has for an object to provide a novel and improved construction and arrangement of drop curtain depending from the upper wall of the egg compartment intermediate the inner and outer edges thereof so as to rest upon the upper surface of an egg and form a hot air space between said egg and a heated surface.

A further object of the invention is to provide an improved construction of egg tray having a balanced or pivoted bottom arranged to be held in either of its inclined positions whereby the egg may be conveniently withdrawn from its compartment and turned to present another surface to the heat during incubation.

Another object of the invention is to form the vertically disposed heated fluid tank with outwardly inclined contact walls coöperating with insertible egg supports having inclined bottoms converging toward said walls by which the egg is directed by gravity toward the tank wall.

Other and further objects and advantages of the invention will be hereinafter set forth and the novel features thereof set forth in the appended claims.

In the drawing—

Figure 1 is a side elevation of the invention;

Fig. 2 an end view thereof;

Fig. 3 is a vertical section on line 3—3 of Fig. 1;

Fig. 4 is a detail elevation of the egg tray;

Fig. 5 a top plan thereof;

Fig. 6 is a detail section of the egg compartment;

Fig. 7 is a detail of the supporting arm; and

Fig. 8 is a detail section of a modified form of the invention.

Like numerals refer to like parts in the several figures of the drawing.

The numeral 10 designates a casing which may be of any desired construction or configuration and is provided with a vertical centrally disposed heating tank 11 adapted to receive a body of liquid. This liquid may be heated by any preferred means, for instance, a flue 12 extending from a lamp or other heater 13 to an outlet pipe 14 at the opposite end of the casing. The temperature of the liquid may be controlled by the usual thermostat 15 disposed at the top of the tank and connected by a lever 16 and rod 17 with the lamp chimney cover 18. The upper portion of the lamp is also inclosed within a casing 19 to prevent loss of heat entering the flue. The tank is provided with an inlet pipe 20 at the upper portion and an outlet 21 at the lower portion to permit the same to be filled and emptied when desired.

As shown in Figs. 3 and 6, the side walls of the tank are formed with outwardly inclined contact walls 22 to provide the egg heating surface, and from the base of these walls a horizontal floor 23 extends outward to the side of the casing, thus forming the egg receiving compartment. Between the inclined walls 22 and the floor a packing 24 of heat non-conducting material is disposed. A similar packing 25 is provided about the lower portion of the tank and also a packing 26 at the upper part thereof to prevent loss of heat.

The egg compartment 27 has secured to the upper wall thereof a depending fabric curtain 28 disposed intermediate the inner and outer edges thereof. The lower free end of this curtain is of greater length than the height of the compartment and extends to the floor 23 so as to lie thereon, as shown in Fig. 6.

The eggs to be incubated are supported by a tray 29 adapted to be slid into the compartment upon the floor thereof. This tray comprises a rectangular frame 30, the sides 31 of which are connected by cross pieces 32, and the ends 33 thereof provided with pivoting sockets 34. These sockets receive the pivots 35 at each end of the balanced bottom 36. This bottom may be retained in either of its inclined positions by suitable releasable catches 37 pivoted on the side walls of the tray. The inclination of this bottom causes the egg to roll by gravity toward the curtain and heated tank wall, and when reversed in position the egg rolls to the opposite side thereof and is turned to present a different surface to be heated.

Each of the compartments is provided with a glazed door 38 pivoted at its lower portion, for instance by hinges 39. These doors when opened, as shown in Fig. 2, form a shelf to support the egg tray, and for the purpose of carrying the weight thereof a pivoted supporting arm 40 is mounted at one side of the end of the door. This arm is formed with the right angular portion 41 connected to the vertical rod 42 pivotally mounted upon the casing so as to be common to all of the doors. As shown at the left of Fig. 2, the arm 40 when swung outward lies beneath the opened door and when not in use is folded snugly against the side and end of the casing, as shown at the right of Fig. 2. This operation is permitted by the angular portion of the arm which always lies against the side of the casing and swings to and from the end thereof.

A modified form of the compartment is shown in Fig. 8, wherein the contact wall 43 of the liquid tank 44 is vertical thus forming a substantially rectangular compartment 45. To the top wall 46 thereof a depending curtain 47 is secured similarly to the curtain 28 hereinbefore described, and coöperating with the curtain and contact wall is an egg tray 48 similar in construction and operation to the tray 29 before described.

In the operation of the invention as shown in Figs. 3 and 6 the bottom of the tray converges toward the inclined contact wall of the tank thus causing the egg to be held by gravity in contact with the curtain and said wall. The act of inserting the tray causes the upper surface of the egg to contact with the curtain for an extended area and carry it forward toward and into contact with the heated wall. This forms above the egg a hot air space between the curtain and said wall which heats the egg over a larger area than if only in contact with the tank wall and preserves an even temperature at the upper portion of the egg which is very essential to secure the most successful incubation. The curtain also cushions the egg against direct contact with the metal of the tank and prevents the injurious effects of excess heat applied at that point. When the tray is removed the curtain acts to retain a supply of warm air while the eggs are being cooled to prevent sudden chilling thereof, and also maintains the hot air space when the tray is withdrawn in turning the eggs. The tray construction properly presents and retains the egg in contact with the curtain so that it is heated by contact in a natural manner at the top where the germ rests and by keeping the air at this point at a uniform temperature a larger percentage of chicks can be hatched than under other conditions. The pivoted catches which extend beneath the side edges of the tray bottom and may be withdrawn therefrom, prevent accidental displacement of the eggs through pressure on the bottom when handling the tray, and also a shifting of the bottom as the hatched chicks come toward the light which would roll the remaining unhatched eggs away from the heat and interfere with their proper incubation.

The construction of the casing, its heating means, and the number and arrangement of the egg compartments may be varied as the essential features of the invention rest in the construction of the compartment and the means for supporting and heating an egg therein during incubation.

What I claim is:—

1. In an incubator, a casing provided with an egg compartment, means for heating the inner wall thereof, a depending curtain supported at a distance from said wall and having a free end of sufficient length to contact with said wall and the upper surface of an egg intermediate the latter and the heated wall, and means for retaining an egg in contact with said curtain.

2. In an incubator, a casing provided with an egg compartment, means for heating the inner wall thereof, a depending curtain supported at a distance from said wall and having a free end of sufficient length to contact with said wall and the upper surface of an egg intermediate the latter and the heated wall, and a tray independent of said compartment and provided with a bottom inclined toward said wall for retaining an egg in contact with said curtain.

3. In an incubator, a casing provided with an egg compartment, means for heating the inner wall thereof, a depending curtain supported at a distance from said wall and having a free end of sufficient length to contact with said wall and the upper surface of an egg intermediate the latter and the heated wall, a tray provided with a centrally pivoted bottom normally inclined toward said wall, and means for retaining said bottom in inclined position.

4. In an incubator, a casing provided with an egg compartment having a substantially horizontal bottom, means for heating an inner wall of said compartment, and an egg supporting tray disposed upon the compartment bottom and having a bottom centrally pivoted at its opposite ends and inclined toward said heated wall.

5. In an incubator, a casing provided with an egg compartment having a substantially horizontal bottom, means for heating an inner wall of said compartment, an egg supporting tray disposed upon the compartment bottom and having a bottom centrally pivoted on its longitudinal axis at opposite ends thereof and inclined toward said wall, and means carried by the tray to engage and retain said tray bottom in either inclined position.

6. In an incubator, a casing provided with an egg compartment, means for heating an inner wall thereof, an egg supporting tray disposed within said compartment and provided with a pivoted bottom normally inclined to retain an egg in contact with said wall, and a depending curtain having a free end constructed and arranged to be interposed between said inner wall and tray when the latter is inserted into the compartment.

7. In an incubator, a casing provided with an egg compartment, means for heating an inner wall thereof, and a curtain depending from the upper wall of said compartment intermediate its inner and outer edges and having a free end of sufficient length to contact with said wall and the upper surface of an egg when the latter is moved toward the heated wall during its insertion.

8. In an incubator, a casing provided with an egg compartment, means for heating an inner wall thereof, and a curtain depending from the upper wall of said compartment intermediate its inner and outer edges and having a free end of sufficient length to contact with said wall and the upper surface of an egg and produce a hot air chamber above said surface when the egg is moved into contact with said curtain during insertion.

9. In an incubator, a casing provided with an egg compartment, means for heating an inner wall thereof, a curtain disposed in said compartment and having a free end of sufficient length to contact with said wall and the upper surface of an egg and produce a hot air chamber above said surface, and means for supporting an egg by gravity against the outer face of said curtain.

10. In an incubator, a casing provided with an egg compartment, means for heating the same, a door for said compartment pivoted at its lower edge, a vertically disposed pivoting member upon the casing at one side of said door adjacent an end of the casing, and a lateral supporting arm from said member constructed and disposed to extend beneath said door when opened or substantially parallel with the casing end when swung away from the door.

11. In an incubator, a casing provided with an egg compartment, means for heating the same, a door for said compartment pivoted at its lower edge, and a pivotally supported arm at one end of said door having portions at an angle to each other whereby its free end may swing beneath said door or against an end of said casing.

12. In an incubator, a casing provided with an egg compartment, means for heating the same, a door for said compartment pivoted at its lower edge, and a supporting arm pivotally mounted at one side of said door and having a portion to engage the side of the casing and a right angular free end to swing beneath the door or against an end of the casing.

13. In an incubator, a casing provided with a centrally disposed water chamber, means for heating the liquid therein, egg compartments at opposite sides of said chamber, closures for the outer side of said compartments, and curtains extending from the upper to the lower walls thereof intermediate the inner and outer edges of the compartments and having a free end of sufficient length to contact with said chamber and the upper surface of an egg when the latter is moved toward said chamber during insertion.

14. In an incubator, a casing provided with a centrally disposed water chamber, means for heating the liquid therein, egg compartments at opposite sides of said chamber, closures for the outer side of said compartments, curtains extending from the upper to the lower walls thereof intermediate the inner and outer edges of the compartments and having a free end of sufficient length to contact with said chamber and the upper surface of an egg when the latter is moved toward said chamber during insertion, and trays insertible in said compartments and having inclined bottoms to direct an egg into contact with the outer face of said curtain.

15. In an incubator, a casing provided with a vertically disposed water chamber, means for heating the same, an egg compartment at one side of said chamber and heated thereby, insulating packing above and below said compartment, a closure for the outer side thereof, a curtain secured to the upper wall of the compartment and having its free end in contact with the lower wall thereof, and an egg tray slidable into said compartment to carry said curtain into contact with the wall of the water chamber.

16. In an incubator, a casing provided with a vertically disposed water chamber, means for heating the same, an egg compartment at one side of said chamber and heated thereby, a curtain secured to the upper wall of the compartment and having its free end in contact with the lower wall thereof, an egg tray having an inclined bottom and slidable into said compartment to carry said curtain into contact with the wall of the water chamber, and a pivoted door for the compartment arranged to be supported in a horizontal position to receive said tray when withdrawn therefrom.

17. In an incubator, the combination of an exterior casing, a vertically disposed fluid receiving tank provided with lateral heated projections having inclined contact walls, and insertible egg supports having bottoms inclined toward said walls with which the eggs are held in contact during incubation.

18. In an incubator, the combination of an exterior casing, a vertically disposed fluid receiving tank provided with lateral heated projections having inclined contact walls, insertible egg supports having bottoms inclined toward said walls with which the eggs are held in contact during incubation, means for heating said tank, and a fabric covering suspended from the top of said contact walls and adapted to engage the eggs and walls when in contacting position.

19. In an incubator, the combination of an exterior casing, a vertically disposed fluid receiving tank provided with lateral projections having inclined contact walls, horizontal strips extending outward from the base of said walls, a non-conducting packing disposed beneath said strips, insertible egg supports having inclined bottoms by which the eggs are brought into contact with the tank wall at their upper portion, and means for heating said tank.

20. In an incubator, the combination of an exterior casing, a vertically disposed fluid receiving tank provided with outwardly inclined contact walls, insertible egg supports having inclined bottoms converging toward said walls by which the eggs are held in contact with the tank wall at their upper portion, and means for heating said tank.

In testimony whereof I affix my signature in the presence of two witnesses.

CECIL H. ABBOTT.

Witnesses:
R. E. BUTLER,
B. H. CATHEY, Jr.